Figure 1A:
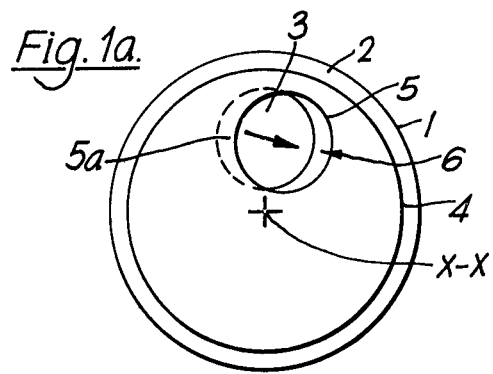

United States Patent [19]

Young

[11] 4,432,512
[45] Feb. 21, 1984

[54] JET PROPULSION EFFLUX OUTLETS

[75] Inventor: Robert W. Young, Luton, England

[73] Assignee: British Aerospace Public Limited Company, London, England

[21] Appl. No.: 69,713

[22] Filed: Aug. 27, 1979

[30] Foreign Application Priority Data

Aug. 31, 1978 [GB] United Kingdom ............... 35153/78

[51] Int. Cl.³ ............................................. F42B 15/18
[52] U.S. Cl. .................................... 244/3.22; 60/230;
239/265.19; 239/265.29; 244/52
[58] Field of Search ...................... 244/3.1, 3.21, 3.22,
244/52, 73, 74, 3.23; 239/265.19-265.31;
60/228-230; 308/233

[56] References Cited

U.S. PATENT DOCUMENTS

| | | | |
|---|---|---|---|
| 2,481,059 | 9/1949 | Africano | 239/265.25 |
| 3,013,494 | 12/1961 | Chanut | 244/3.22 |
| 3,039,264 | 6/1962 | Ernest | 239/265.25 |
| 3,150,486 | 9/1964 | Hollstein et al. | 239/265.25 X |
| 3,165,889 | 1/1965 | Kershner | 239/265.25 |
| 3,200,586 | 8/1965 | Ernest | 239/265.27 X |
| 3,302,886 | 2/1967 | Doxey | 239/265.19 |
| 3,367,112 | 2/1968 | Mainhardt | 244/74 |
| 3,410,505 | 11/1968 | Gildon et al. | 244/3.22 |
| 4,163,534 | 8/1979 | Seeger | 244/3.22 |

FOREIGN PATENT DOCUMENTS

| | | | |
|---|---|---|---|
| 789410 | 1/1958 | United Kingdom . | |
| 834969 | 5/1960 | United Kingdom . | |
| 875205 | 8/1961 | United Kingdom . | |
| 875328 | 8/1961 | United Kingdom . | |
| 944978 | 12/1963 | United Kingdom . | 308/233 |
| 1046793 | 10/1966 | United Kingdom . | |
| 1296215 | 11/1972 | United Kingdom . | |

*Primary Examiner*—Harold J. Tudor
*Attorney, Agent, or Firm*—Cushman, Darby & Cushman

[57] ABSTRACT

A jet propulsion efflux outlet assembly for effecting control of a flight vehicle in the pitch, yaw and roll senses having a nozzle through which efflux issues, a spoiler plate with an aperture through which the issueing efflux passes, the spoiler plate being movable laterally to effect control in pitch and yaw and being rotatable for control in roll.

10 Claims, 15 Drawing Figures

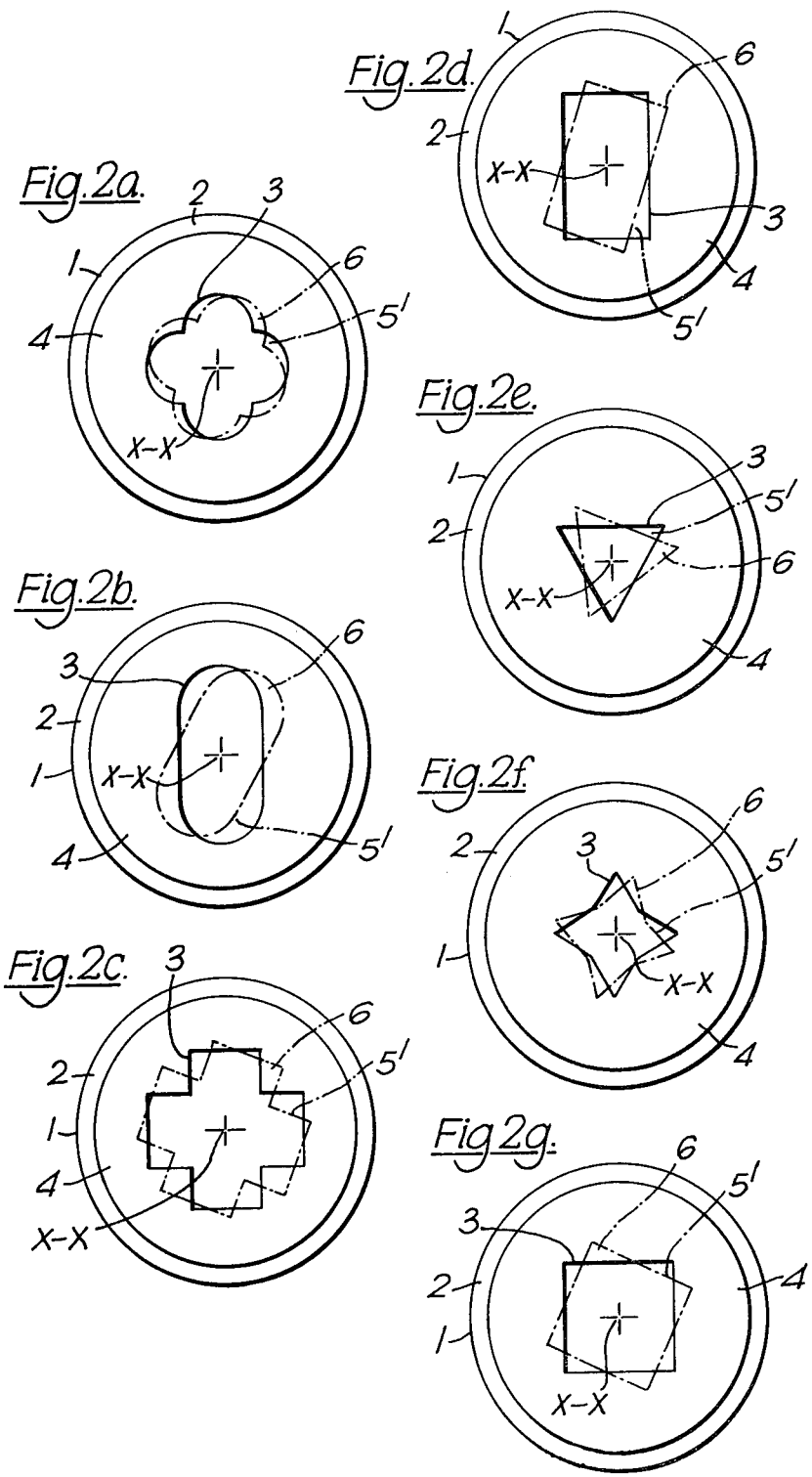

JET PROPULSION EFFLUX OUTLETS

This invention relates to jet propulsion efflux outlet assemblies for controlling a flight vehicle at least about its roll axis and preferably also about its pitch and yaw axes in addition to effecting propulsion.

The flight vehicle may be, for example, a guided weapon in which case the efflux outlet assembly may form part of a rocket propulsion system.

According to the present invention a jet propulsion efflux outlet assembly for controlling a flight vehicle at least about its roll axis includes, in combination, nozzle means defining an aperture through which efflux issues to exert a propulsive thrust with at least one edge region of the aperture radially spaced further from the roll axis than other edge regions of the aperture, spoiler means having an impingement region on which the issuing efflux can impinge, actuating means to effect relative displacement between the nozzle means and the spoiler means such that the efflux issueing from that part of the aperture remote from the roll axis impinges upon the impingement region and causes a change in the thrust direction which effects a torque acting at least in the roll sense.

The impingement region of the spoiler means preferably bounds an aperture through which the issueing efflux passes. Conveniently, the aperture matches that of the nozzle means.

The nozzle means conveniently defines a single aperture of non-circular form symmetrically disposed with reference to the roll axis, but alternatively it may define an aperture asymmetrically disposed with reference to the roll axis. In the latter case the nozzle means preferably defines at least one further aperture.

Preferably, the relative displacement between the nozzle means and the spoiler means to effect control in the roll sense is in the form of a rotational movement about the roll axis. In this case relative lateral displacement is additionally effected such that the impingement region causes a change in the thrust direction to effect torques acting in the pitch and yaw senses.

Figure 3A:
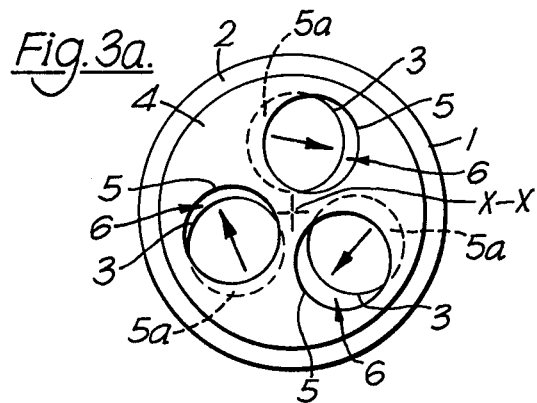
Figure 3B:
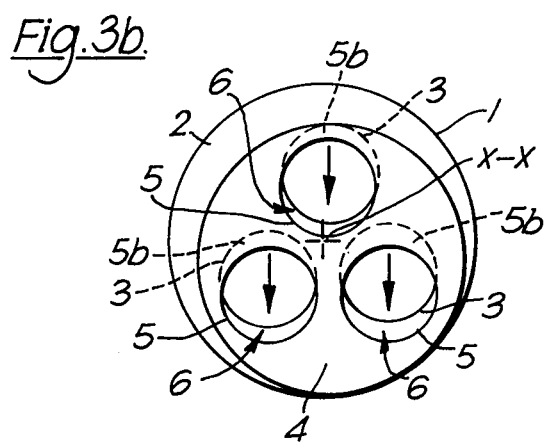
Figure 3C:
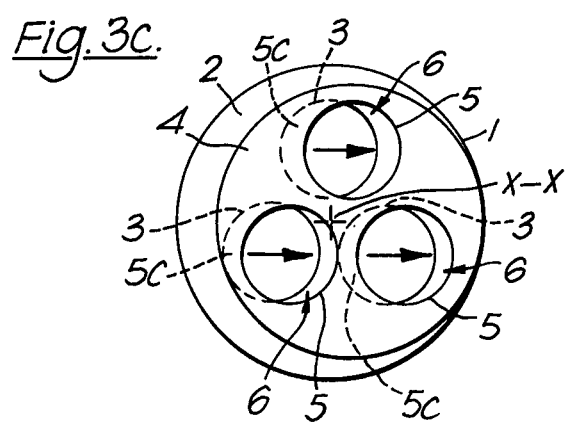
Figure 4:
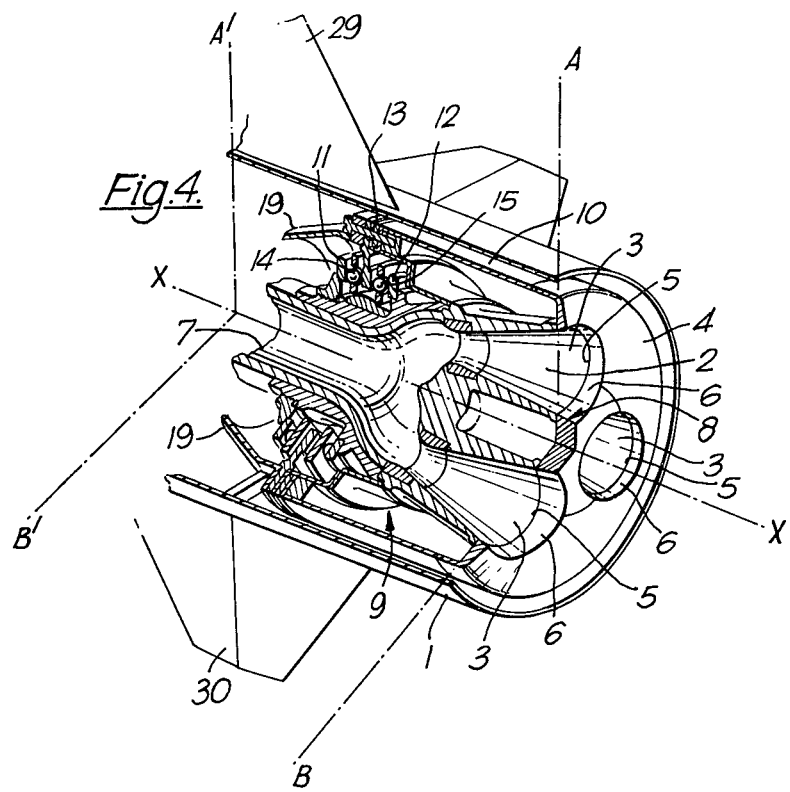

Embodiments of efflux outlet assemblies according to the invention are described with reference to the accompanying drawings in which:

FIGS. 1a, b, and c, illustrate diagrammatically an efflux outlet assembly in three conditions, the assembly being viewed from the rear;

FIGS. 2a to 2g illustrate diagrammatically alternative efflux outlet assemblies, the assemblies again being viewed from the rear;

FIGS. 3a, b, and c, illustrate diagrammatically a further alternative efflux outlet assembly in three conditions corresponding to those of FIG. 1, and FIG. 4 illustrates an isometric view of an embodiment of efflux outlet assembly of the form of FIGS. 3a, b, and c, the view having a segment removed for clarity.

Figure 5:
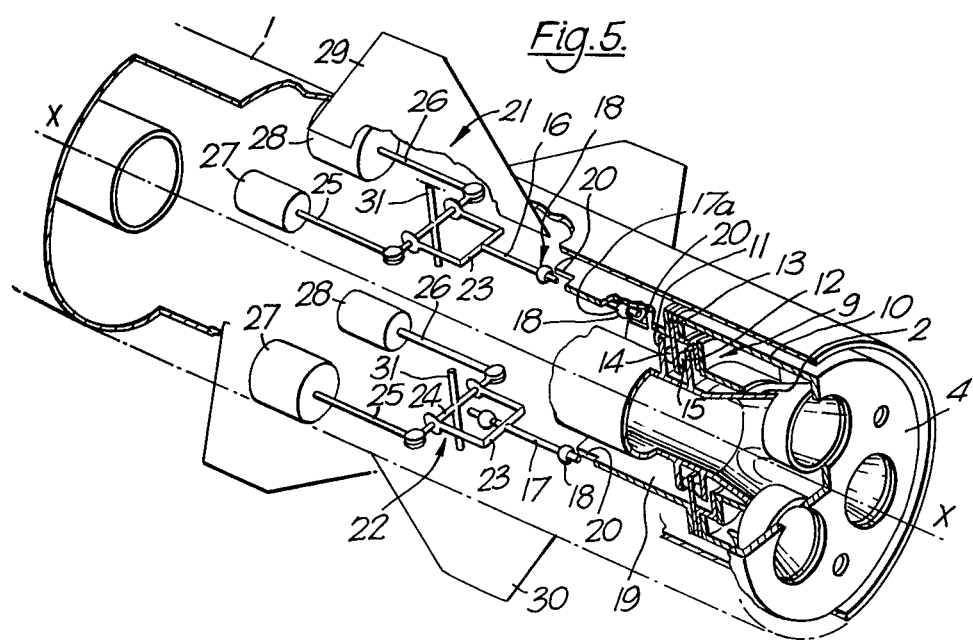

FIG. 5 is a similar view to that of FIG. 4 but of a further embodiment and illustrating certain actuation mechanisms in a diagrammatic manner with various segments removed for viewing clarity.

Referring initially to FIGS. 1a, b, and c, a guided weapon 1 has a roll axis X—X about which it requires to be controlled simultaneously with control in both the pitch and yaw senses.

The guided weapon is viewed from the rear along the X—X axis. It has an efflux outlet assembly including a nozzle member 2 which defines a single aperture 3 through which an efflux from a rocket motor issues. The aperture 3 is illustrated to be of circular form although alternative non-circular forms can be used.

To effect control of the guided weapon by means of the efflux, the efflux outlet assembly also includes a spoiler plate 4 mounted adjacent but downstream of the nozzle member 2. The plate 4 has an impingement lip 5 which bounds an aperture 6 through which the issuing efflux flows. In this instance the aperture 6 matches the aperture 3, but in other embodiments they are not necessarily the same shape or size.

The plate 4 is mounted (by means not shown but described below) for limited rotation about the X—X axis in both clockwise and anti-clockwise directions to a position exemplified by FIG. 1a where the aperture 3 is partly blocked by the plate 4 so that a portion 5a of the lip 5 is impinged upon by the efflux and causes a change in the thrust direction. Because of the offset from the roll axis X—X this effects a torque acting in the roll sense.

Figure 1B:
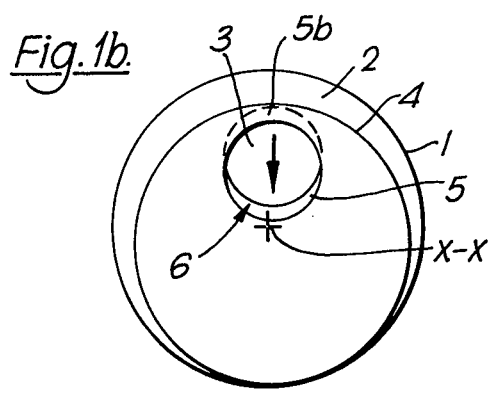

The plate is further mounted for to and fro bodily movements in two mutually orthogonal directions generally transverse to the roll axis X—X. In FIG. 1b a portion 5b of the lip 5 causes a change in the thrust direction which effects a torque in the pitch sense, whilst in FIG. 1c a portion 5c of the lip 5 causes a change in the thrust direction which effects a torque in the yaw sense.

Figure 1C:
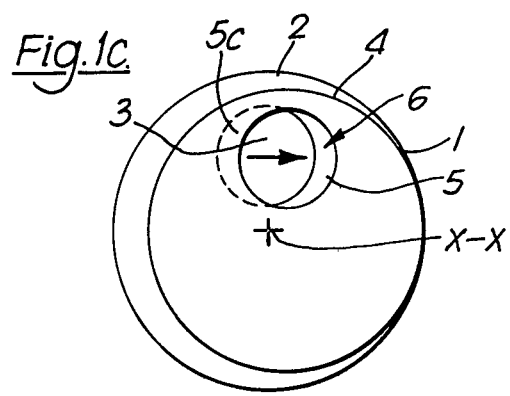

With this arrangement, because of the asymmetrical location of the aperture 3 with reference to the X—X axis, the control effect of that rotational movement of the plate 4 as described with reference to FIG. 1a, can also be realised by a purely lateral movement such as that described with reference to FIG. 1c; the rotational movement is described to give a basis for the description of the later Figures.

Referring now to FIGS. 2a to g, these Figures are similar views to FIG. 1a, but illustrate alternative shapes and dispositions of the apertures 3 and 6 in which the apertures are symmetrically disposed with respect to the axis X—X. Again the apertures 6 match the apertures 3 but this is not necessarily the case providing a portion 5' of the lip 5 protrudes into and is impinged upon by the efflux when the plate 4 is rotated about the axis X—X. In each Figure a rotated position of the aperture 6 is shown in broken outline; it is to be noted that the portions 5' are all remote from the axis X—X so that a torque is effected about that axis. Only the rotational movement of the plate 4 is shown, the bodily lateral movement for control in the pitch and yaw senses is present but is not shown so that the Figures remain clear.

FIGS. 3a, b, and c, respectively correspond with FIGS. 1a, b, and c. They depict an efflux outlet assembly essentially similar to the assembly of those Figures but in which the nozzle member 2 defines two additional apertures 3 positioned and shaped to balance the asymmetry of the single aperture. The plate 4 has additional matching apertures 6 respectively bounded by a lip 5. The multi-apertured arrangement functions in an identical fashion to that described with reference to FIGS. 1a, b, and c, in that rotation of plate 4 about the axis X—X is such that the portions 5a of the lips are impinged upon to effect a torque acting in the roll sense, and the portions 5b and 5c are impinged upon to effect torques acting in the pitch and yaw senses.

FIG. 4 illustrates an embodiment of efflux outlet assembly having the outlet configuration shown in FIGS. 3a, b, and c from a different viewing aspect chosen to more clearly show one example of its incorporation in the guided weapon 1. The removed segment, to which reference has already been made, is bounded by planes including the lines A—X—B and A'—X—B', X—X being the roll axis of the weapon.

The guided weapon 1 carries a nozzle member 2 which defines three apertures 3 through which efflux from a rocket motor, not shown, issues. The nozzle member 2 is fed by way of a duct 7 lying co-axially with the axis X—X; branches direct the efflux to all three apertures.

A spoiler plate 4 is mounted adjacent but downstream of the nozzle member 2 and has impingement lips 5 which bound three apertures 6, in this case matching the apertures 3, through which the issueing efflux flows. The nozzle member 2 is so shaped (i.e. the communicating regions between the duct 7 and the apertures 3 are initially of convergent and subsequently of divergent form) that the flow issueing from the apertures 3 is expanding. Accordingly the apertures 6 in the plate 4 are shaped to allow this expansion to continue by being of increasing area from upstream to downstream. This feature is shown at reference numeral 8 in FIG. 4.

The plate 4 is mounted for limited rotation about the X—X axis in both the clockwise and anticlockwise directions and for bodily lateral movement generally transverse to the roll axis X—X in two orthogonal directions. Such mounting is provided by actuating means including an annular support 9 through which the duct 7 extends and a carrier 10 of cylindrical form, lying around a rear end of the duct 7 and the nozzle member 2, and carrying the plate 4 as an end wall of that cylinder. This latter feature has advantage in that efflux escape between the apertures 3 and the apertures 6 is minimised.

In this embodiment, the annular support 9 comprises two spaced annular plates 11 and 12, anchored to the nozzle member 2 and the duct 7, between which a further annular plate 13 is constrained to lie by annular bearing races 14 and 15. The annular plates 11, 12 and 13 all lie in planes transverse to the roll axis X—X. The plate 13 is bodily movable in its own plane in any direction (that is to say laterally) and can be simutaneously rotated around the roll axis. The annular plate 13 is rigidly connected to the carrier 10 and effectively forms an end wall of the cylinder remote from the plate 4.

Referring now to FIG. 5, the embodiment illustrated therein is similar to that of FIG. 4; similar references will be employed for similar items. The embodiment will be employed for similar items. The embodiment illustrated has the weapon outer skin removed, the annular support region partly sectioned, and a segment of the nozzle member 2 removed for ease of inspection, bodily and rotational movement of the plate 13 (within its own plane) and hence of its associated carrier 10 and plate 4, is effected by four equally spaced longitudinally extending rods, of which only two, referenced 16 and 17 respectively, are fully illustrated for clarity. A further rod is partly illustrated at 17a. The rods 16 and 17 lie opposite one another above and below the X—X axis, as drawn, whilst the other two non and partly illustrated rods lie opposite one another to the right and left of the X—X axis. Each rod terminates in a bearing sphere 18 at its rearward end.

Extending forwardly toward the rods from the annular plate 13 is a tubular coupling member 19. This member has four (only three are shown) longitudinal slots 20 equally spaced around its forward end, the slots having open ends into which the rods protrude. The bearing spheres 18 engage the side walls of their respective slots.

Each rod is carried and operated by its own actuation mechanism, but since only the rods 16 and 17 are fully illustrated, it is convenient only to illustrate the actuation mechanisms 21 and 22 associated with those rods. The mechanisms associated with the other two rods are identical to those referenced 21 and 22.

Each mechanism includes a yoke 23. Each yoke 23 carries a rod 16 or 17 at its rearward end and has a bifurcated forward end pivoted to a transverse bar 24. The bar 24 itself is pivotally carried by longitudinally extending piston rods 25, 26 associated with piston/cylinder assemblies 27 and 28, respectively.

In operation, longitudinal movement of the rod 25 and similar opposite movement of the rod 26 of the mechanism 21 causes the bar 23 to pivot about a vertical axis, as drawn, thereby causing its yoke 23 and its associated rod 16 to be swung laterally. Similar movements of the mechanism 22 cause the rod 17 also to be swung laterally. To effect bodily horizontal displacement of the plate 13 in its own plane and hence to effect similar movement of the plate 4, both mechanisms 21 and 22 are arranged to swing the rods 16 and 17 laterally in the same sense. For example, when the piston rods 26 move forward, the piston rods 25 move rearward and the rods 16 and 17 both move in the same direction so that the plate 4 is moved bodily in that same sense.

To effect rotation of the plate 13 and hence to effect similar movement of the plate 4 about the axis X—X, the rods 16 and 17 are moved differentially with reference to one another. For example the piston rod 26 of the mechanism 21 is moved rearwardly whilst the piston rod 26 of the mechanism 22 is moved forwardly so that the roads 16 and 17 swing in opposite senses.

The non-illustrated pair of mechanisms are arranged to operate in the same manner as that described with reference to the mechanisms 21 and 22.

If, as illustrated, the weapon is provided with fins these can be operated simultaneously with the spoiler 4 to aid control. In FIG. 5 a control fin 29 is associated with the mechanism 21, a control fin 30 is associated with the mechanism 22, and other control fins are associated with the non-illustrated mechanisms.

To effect control movement of the fins, the bars 24 are provided with shafts 31 which, being integral with the bars 24 and positioned to lie on their pivot axis, rotate to effect fin rotation.

We claim:
1. A jet propulsion efflux outlet assembly for controlling a guided flight vehicle in opposed senses about at least its roll axis while in flight comprising in combination;
   nozzle means defining a plurality of aperture means through which efflux issues to exert a propulsive thurst, the plurality of aperture means being symmetrically disposed about the roll axis and shaped so that at least one edge region of each aperture means is radially spaced further from the roll axis than other edge regions of the same aperture means;
   a spoiler plate member defining a plurality of aperture means matching in both number and configuration said plurality of aperture means of said nozzle means, each aperture means of said spoiler plate member having an impingement region on which the issuing efflux can impinge;

support means for supporting said spoiler plate member in a position generally transverse to the roll axis adjacent but downstream of said nozzle means and allowing movement of said spoiler plate member in the form of rotation in the roll sense; and actuating means operable in flight to turn said spoiler plate member in opposed roll senses, such that efflux issuing from a part of each aperture means remote from the roll axis impinges on an associated impingement region and causes a roll torque of magnitude and sense dependent on the respective magnitude and sense of movement of said spoiler plate member.

2. A jet propulsion efflux outlet assembly according to claim 1 wherein the impingement region of the spoiler means bounds an aperture through which the issueing efflux passes.

3. A jet propulsion efflux outlet assembly according to claim 2 wherein the aperture matches that of the nozzle means.

4. A jet propulsion efflux outlet assembly according to claim 1 wherein the nozzle means is shaped so that the efflux issueing therefrom is caused to expand and the spoiler means is shaped to allow such expansion to continue.

5. A jet propulsion efflux outlet assembly according to claim 1 wherein the spoiler means comprises a plate member positioned generally transverse to the roll axis adjacent but downstream of the nozzle means, and the actuating means includes support means, and carrier means extending from the support means to carry the spoiler means, the support means allowing movement of the carrier means in the pitch and yaw senses and rotation in the roll sense.

6. A jet propulsion efflux outlet assembly according to claim 5 in which the carrier means is in the form of a cylinder, and the plate member of the spoiler means forms an end wall of that cylinder.

7. A jet propulsion efflux outlet assembly according to claim 5 wherein the support means includes two spaced fixed members, a movable member, and bearing means, carried by the two fixed members for constraining the movable member to lie between the fixed members for both rotational and bodily movement in a plane transverse to the roll axis, the movable member being connected to the carrier means.

8. A jet propulsion efflux outlet assembly according to claim 7 wherein the actuating means further includes two longitudinally extending rod members, coupling means coupling the rod members to the movable member, the rod members lying diametrically opposite one another one to each side of the roll axis, and means to effect lateral swinging of the rods with reference to the roll axis both in the same sense and differentially.

9. A jet propulsion efflux outlet assembly according to claim 8 wherein the means to effect lateral swinging of each rod includes a pivoted yoke having a bifurcated portion between which the rod is attached and to which twin longitudinally extending jack means are connected for differential operation.

10. A jet propulsion efflux assembly as recited in claim 1, wherein said support means further allows movement of the spoiler plate member in othogonal transverse senses, and said actuating means is further operable to effect respective transverse movements of the spoiler plate member to effect torques acting in the pitch and yaw senses additionally to that acting in the roll sense.

* * * * *